United States Patent [19]

Stouffer et al.

[11] Patent Number: 4,709,622
[45] Date of Patent: Dec. 1, 1987

[54] FLUIDIC OSCILLATOR

[75] Inventors: Ronald D. Stouffer; Patrick T. Sharkitt, both of Silver Spring, Md.

[73] Assignee: Bowles Fluidics Corporation, Columbia, Md.

[21] Appl. No.: 848,440

[22] Filed: Apr. 7, 1986

[51] Int. Cl.$^4$ .............................................. B60H 1/34
[52] U.S. Cl. ........................................ 98/2; 98/2.09; 98/40.2
[58] Field of Search ................ 98/2, 2.08, 2.09, 40.18, 98/40.2; 137/81.5, 820; 239/265.17, 284

[56] References Cited

U.S. PATENT DOCUMENTS

| | | | |
|---|---|---|---|
| 3,832,939 | 9/1974 | Kakei et al. | 98/2.09 |
| 4,365,540 | 12/1982 | Honrado | 98/2 |
| 4,377,107 | 3/1983 | Izumi | 98/2 X |
| 4,407,186 | 10/1983 | Izumi et al. | 98/2 |

FOREIGN PATENT DOCUMENTS

| | | | |
|---|---|---|---|
| 54-108323 | 8/1979 | Japan | 98/40.18 |
| 57-2948 | 1/1982 | Japan | 98/40.18 |
| WO85/00783 | 2/1985 | PCT Int'l Appl. | 98/2.09 |

OTHER PUBLICATIONS

Van Nostrand's Scientific Encyclopedia, Sixth Edition, Van Nostrand Reinhold Company, pp. 1233-1236.

Primary Examiner—Harold Joyce
Attorney, Agent, or Firm—Jim Zegeer

[57] ABSTRACT

A fluidic oscillator is relatively short in length (under about 2.5 W where "W" is the width of the power nozzle) and has a leaky splitter located proximate the center of the outlet flare so as to divide the outlet into essentially two alternating slug flows. The floor and/or ceiling of the oscillator diverge between about six degrees and ten degrees to allow the jet stream to expand and thereby avoid creating a back pressure to control ports. When used as a windshield defrost/defog nozzle, vanes forming part of the leaky splitter are laterally shifted so that the largest opening is on the driver side and the smaller opening is on the passenger side so as to direct more defrost energy towards the driver's side.

9 Claims, 12 Drawing Figures

FLOW STRAIGHTNER ASSEMBLY

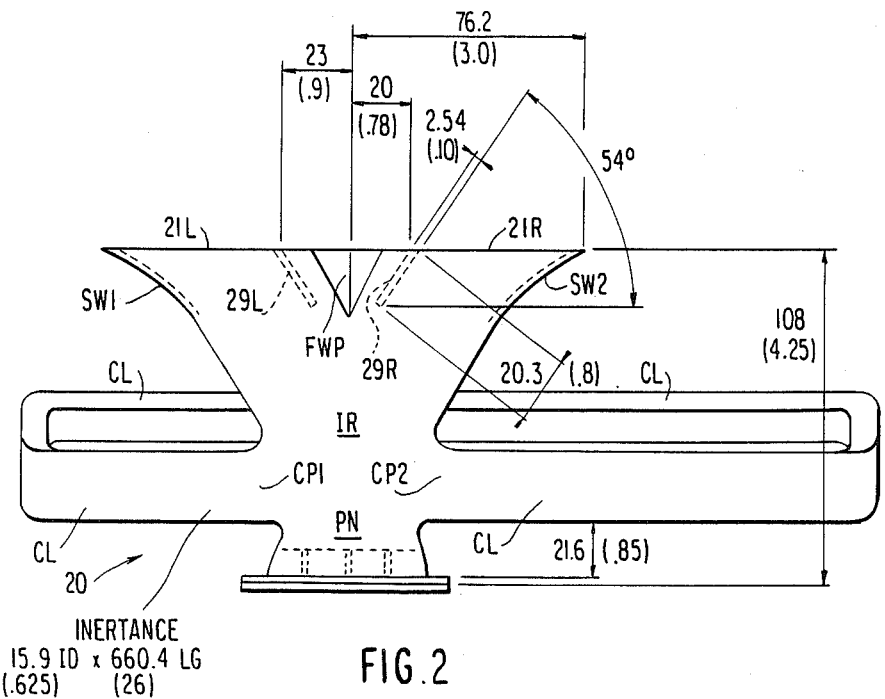
FIG.2
FIG.3
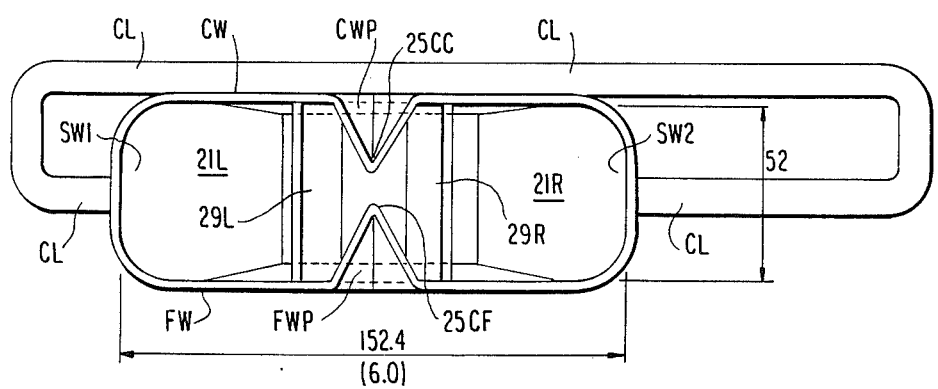

FLUIDIC OSCILLATOR

REFERENCE TO RELATED APPLICATIONS

This application is related to Stouffer U.S. application Ser. No. 522,884, entitled "Vehicle Windshield Defrost Apparatus With Reduced Dashboard Space Requirements"; Boone et al. U.S. application Ser. No. 716,737, entitled "Air Sweep Defroster"; and Stouffer U.S. application Ser. No. 748,065, entitled "Novel Inertance Loop Construction for Air Sweep Fluidic Oscillator".

BACKGROUND OF THE INVENTION

The use of a sweeping jet fluidic oscillator for issuing a sweeping jet of air to, for example, clear the windshield of an automobile, is known in the art. In the above-identified related application Ser. No. 522,884 of Stouffer, one embodiment uses a continuous inertance loop fluidic oscillator in which a cross-over type fluidic oscillator has a pair of converging sidewalls leading to a common outlet with the air jet issuing from the power nozzle being caused to shift from one side of the chamber to the other and issue in a sweeping fashion through the common outlet by virtue of the action of a continuous inertance loop connecting control ports at each side of the air jet as it issues from the power nozzle. In the above-identified related application of Boone et al., the oscillator portion is made relatively short and instead of a diverging-converging cross-over type chamber fluidic oscillator element, the sidewalls of the interaction region diverge from each other to form an elongated slot to accomodate the sweeping angle of the oscillator. The pair of control ports immediately adjacent and downstream of the power nozzle are connected to a continuous inertance loop with several different techniques being utilized for accomodating the inertance loop, which is of a length and cross-sectional area so as to assure that the frequency of oscillation is below about 12 Hz for proper defrosting of the windshield. In the above-identified related application of Stouffer Ser. No. 748,065, the inertance loop has a pair or matching sections for coupling to the control ports of the oscillator, a pair of loop sections connected to the respective ends of the matching sections, a pair of transition sections coupling the ends of the loop sections to a cross-over or common section which is substantially flat and parallel to the plane of the fluidic element.

The present invention is an improvement on the fluidic oscillator disclosed in the above-identified related applicatains, and especially the fluidic oscillator disclosed in the above related application of Boone et al.

It is an object of the invention to provide an improved fluidic oscillator; more particularly, a further object of the invention is to provide an improved fluidic oscillator element which alternately issues slugs of concentrated air and is relatively short, easier and less expensive to fabricate, and has particularly unique applicability to defrost/defog function of vehicle windows.

According to this invention, the fluidic oscillator has a relatively short length so that it can be incorporated under the dash/instrument panel of an automotive vehicle for distributing defrost/defog air on both the driver and passenger sides of the vehicle to thereby rapidly and efficiently clear the windshield of frost and/or fog. The oscillator includes a power nozzle having a predetermined cross-sectional area, an interaction region defined by ceiling and floor walls and a pair of diverging sidewalls flaring to an outlet. A pair of control ports on the opposite sides of the interaction region and in advance of the diverging sidewalls, are interconnected by a continuous inertance loop or member. According to this invention a leaky splitter is located proximate the center of the outlet and modifies the distribution pattern of the air so that for the defrost/defog operation of a vehicle windshield, for example, essentially two alternating jets or slugs of defrost/defog air are alternately directed at predetermined positions and angular orientations on the windshield, each of the two jets being of full energy content and not difused. The leaky splitter is comprised of a necking or pinching end of the floor and ceiling walls proximate the center of the outlet and includes a pair of sweep angle enhancing vanes spacedly located to each side of the neck end or pinched end ceiling and/or floor walls.

Since it is desirable that the driver side be first cleared of frost or fog, the sweep angle enhancing vanes are biased or offset toward the passenger side so that the largest opening is oriented and aimed towards the driver's side of the windshield and the smallest opening is oriented or aimed toward the passenger side of the windshield. In a preferred embodiment, the floor and ceiling walls have angles of about six degrees to ten degrees to the axial center line of the interaction region to provide an expanding outlet which is needed for interaction regions which are under about 2.5 W in length where W is the width of the power nozzle. This space is needed to allow the jet to expand in the interaction region so as to not create a back pressure at the control ports which would interfere with the oscillation. In a preferred embodiment, the power nozzle has an aspect ratio of about 1:1 which means that it is about as wide as it is high, and that each of the two jets issuing through the sidewalls is approximately of the same cross-sectional shape and slightly larger in cross-sectional area. Thus, the invention in effect is switching the jet issuing through the power nozzle first through one side of the outlet and then the other due to the action of the leaky splitter. That is, as the jet is switching from one of the diverging sidewalls towards the other of the diverging sidewalls, it impinges on the leaky splitter for a very short period of time. The splitter is relatively a large element but due to the leakiness of it, its impedance is significantly lower than a non-leaky splitter and hence does not adversely effect oscillation.

In addition, the distribution can be tailored by the addition of various thickness to the pinching end of a floor and ceiling to achieve better tailoring or distribution of the jets impinging upon the windshield and thereby effect cleaning of other areas of glass (such as side windows) after clearing of the main or viewing areas or see areas.

It will be appreciated that while the invention finds particular applicability and uniqueness in its use for the clearing of frost and/or fog from windshields, the oscillator nevertheless has other uses besides clearing glass areas on vehicles for better viewing purposes.

BRIEF DESCRIPTION OF THE DRAWINGS

The above and other objects, advantages and features of the invention will become more apparent in light of the following specification and accompanying drawings wherein:

FIG. 2 is a side elevational view of a fluidic oscillator incorporating the invention illustrating typical dimensional parameters, FIG. 3 is an end view illustrating the leaky splitter in the outlet of the fluidic oscillator.

DETAILED DESCRIPTION OF THE INVENTION

In general, fluidic oscillators according to the invention have an interaction region IR having an upstream end and a downstream end with a power nozzle PN for projecting a jet of air (or other fluid) into the interaction region. First and second control ports CP1 and CP2 at each side of the upstream end of the interaction region IR and at each side of the jet of air projected into the interaction region by the power nozzle, are interconnected together by a continuous inertance loop CL. The interaction region is defined by a pair of diverging sidewalls SW1 and SW2 and floor and ceiling walls FW and CW with the upstream ends of the diverging sidewalls SW1 and SW2 being connected directly to the upstream wall forming the control ports CP1 and CP2, respectively. In the operation, the air leaving power nozzle PN causes the jet to oscillate back and forth between sidewalls SW1 and SW2 at at frequency determined by the length of continuous inertance loop CL and the oscillating frequency is essentially proportional to the flow of air through the power nozzle PN—the higher the flow rate, the higher the frequency of oscillation. In the preferred embodiment when used as a defrost/defog nozzle for vehicles, the frequency of oscillation is under about 12 Hz. In the configuration disclosed herein with the parameters shown, the length of the inertance loop between control ports is 15 to 20 inches for a given cross-sectional area of the continuous inertance loop CL.

Figure 5:
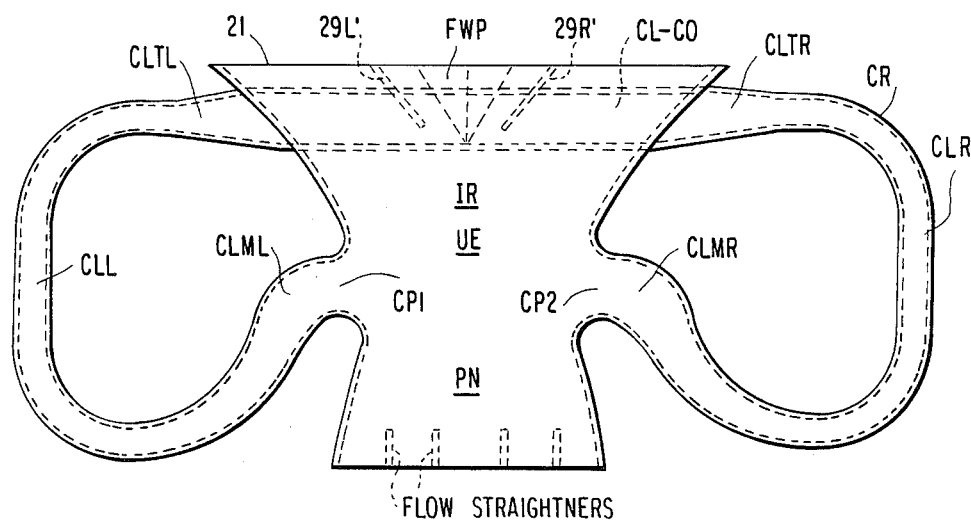
FIG. 5 is a side sectional view of the fluidic oscillator of this invention installed to issue defrost/defog air on the windshield of an automotive vehicle.
Figure 6A:
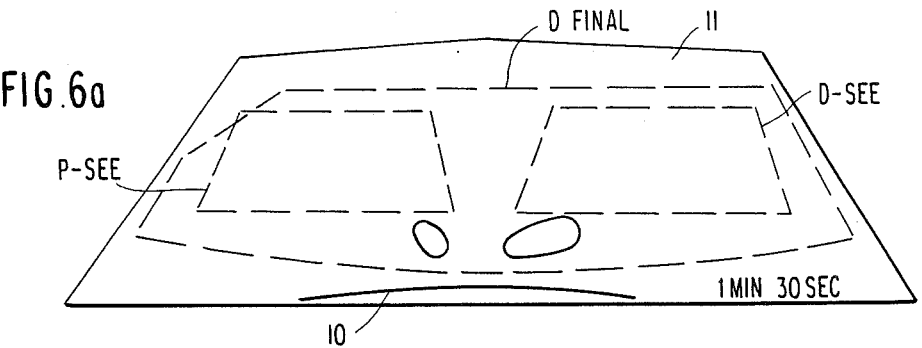
FIGS. 6a-6g are illustrations showing the defrost efficacy of the fluidic oscillator according to the invention.
Figure 6B:
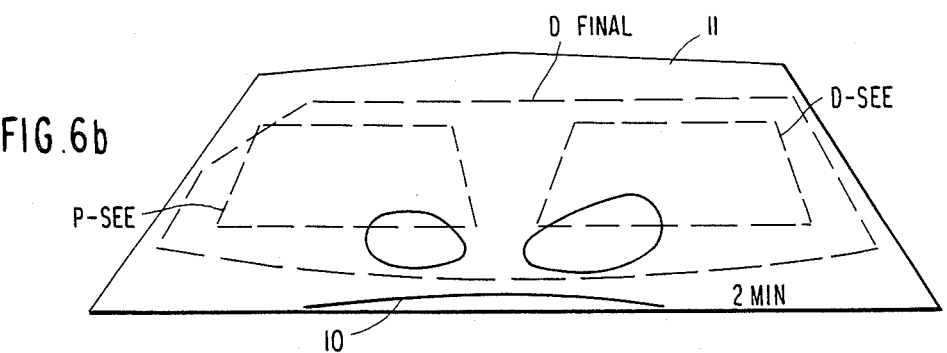
Figure 6C:
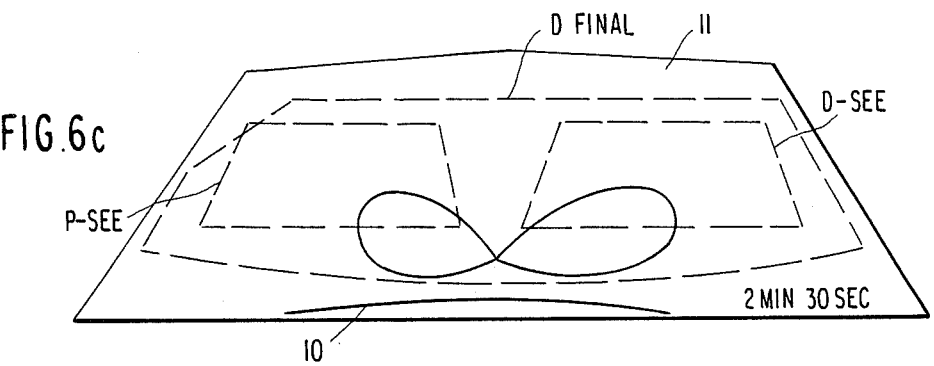
Figure 6D:
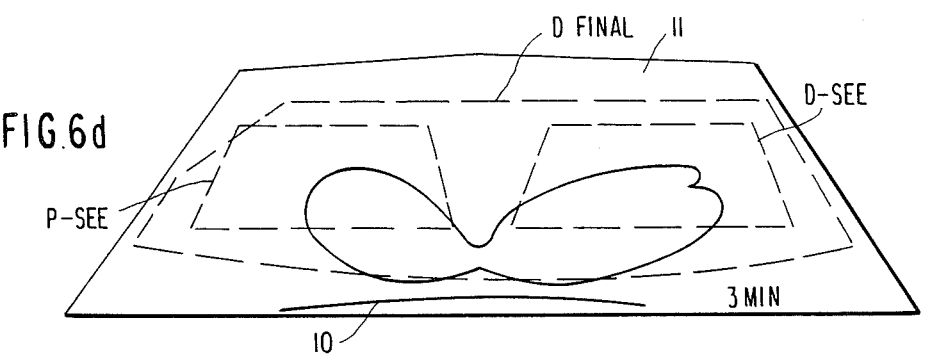
Figure 6E:
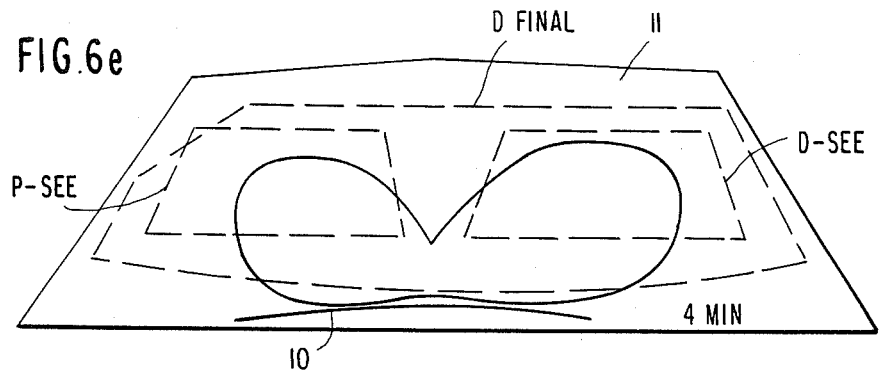
Figure 6F:
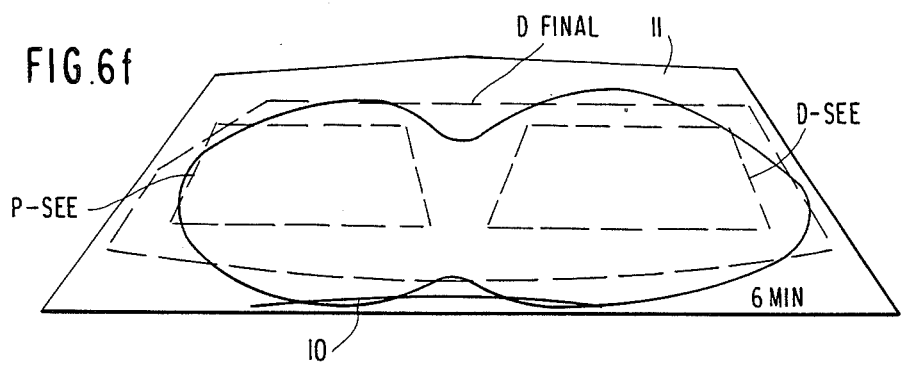
Figure 6G:
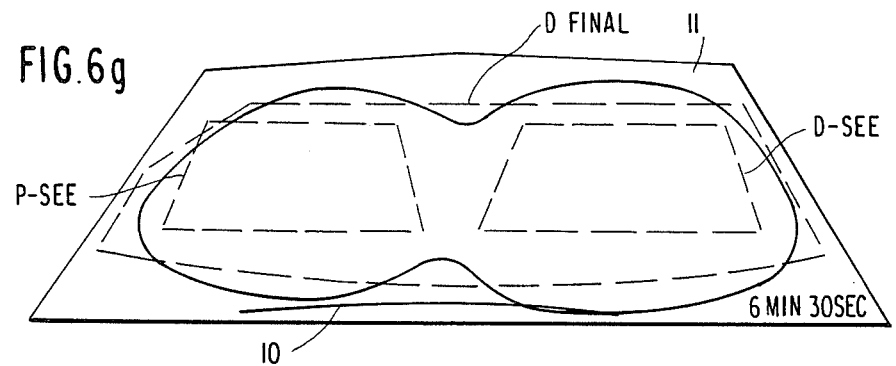

FIG. 5 shows the dashboard of instrument panel of an automobile which is adjacent to wind screen 11 and has an instrument cluster 12. An air distributing plenum 14 receives windshield clearing air (for either defrosting and/or defogging) (and it could be other areas besides the windshield, such as the rear window) from a heat exchanger (not shown) and delivery to the windshield depending upon the position of a control (not shown) in a position to be easily operable and accessable by the driver and/or passenger, all of which are conventional and form no part of the present invention other than being a control source of defrost/defog air under pressure.

Figure 1:
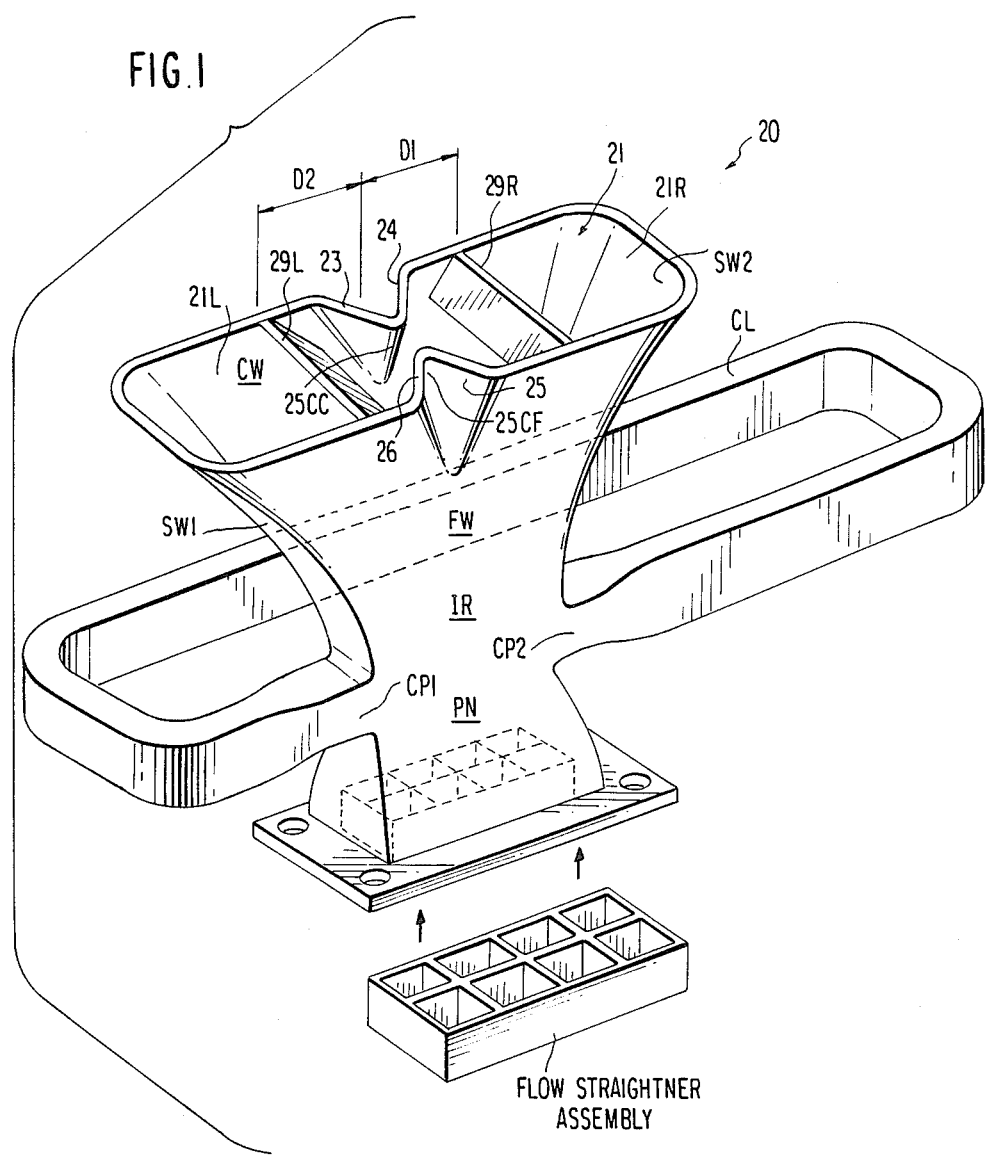
FIG. 1 is an isometric view of a fluidic oscillator incorporating the invention.

Referring to FIG. 1, fluidic oscillator 20 includes the following volumetric regions:

Interaction region IR, which is defined, as noted above, by a pair of diverging sidewalls SW1 and SW2 and ceiling and floor walls CW and FW, a pair of opposing control ports CP1 and CP2, a power nozzle PN coupled to a supply of fluid under pressure (not shown), a continuous inertance loop CL interconnecting control ports CP1 and CP2. Diverging sidewalls SW1 and SW2 and floor wall FW and ceiling wall CW form outlet 21.

LEAKY SPLITTER

Leaky splitter structure 22 is located proximate the center of outlet 21. Leaky splitter 22 is comprised of a pair of "pinched" or "necked" in members FWP and CWP in the floor and ceiling walls, respectively. In this embodiment, pinched or necked members FWP and CWP are formed of a pair of triangular panels 23, 24 and 25, 26 respectively, which intrude into outlet 21 from the floor FW and ceiling CW walls and in effect divide the outlet into lobes 21L and 21R. It is noted that the crest 25CC and 25CF are spaced apart and do not contact each other to allow a small flow of fluid therebetween from which is derived the term "leaky splitter". A pair or flow deflection or sweep angle enhancing vanes 29L and 29R are positioned close to but spaced from the bases or points of joinder of triangular panels 23, 24 and 25, 26 to floor FW and CW wall panels so that there can also be flow between the flow enhancing vanes 29L and 29R and the necked in members FWP and CWP so that the entire structure constitutes a leaky splitter forming two air outlet lobes 21L and 21R. Thus, when the main jet of air or fluid is switched to the left, substantially all of the fluid flows out lobe 21L. A small portion of fluid is directed in a generally parallel path between the panels 23 and 26 and flow sweep enhancing vane 29L but the main lobe is directed to the left. Likewise, when the fluidic oscillator is switched, and the main air flow through outlet 21 is through the right lobe 21R, there is a small flow between the pinched end portions or crests of the necked in members FWP and CWP as well as a small parallel flow between the panels 24 and 25 and sweep angle enhancing vane 29R. The sweep angle enhancing vanes 29L and 29R cause the angles of the jet issuing through their respective outlet lobes 21L and 21R respectively, to exit at greater angles relatively to the axial center of the device.

The power nozzle PN has an aspect ratio of about 1:1 and each of the individual side lobes 21L and 21R have substantially similar aspect ratios and are slightly larger in cross-section.

In vehicle uses, the flow paths leading to the power nozzle PN may be varied resulting in a velocity profile at the power nozzle which is not uniform and could interfere with the oscillatory operation. A long power nozzle throat could provide the time to correct the velocity profile but in the preferred embodiment, flow straightener means as disclosed in the above-identified application of Boone et al. are used to significantly shorten the power nozzle throat just in advance of the power nozzle to result in a fluidic oscillator whose overall length is relatively short. As shown in FIG. 1, a grid of vanes 35 is positioned just in advance of the power nozzle PN is improved.

Figure 4:
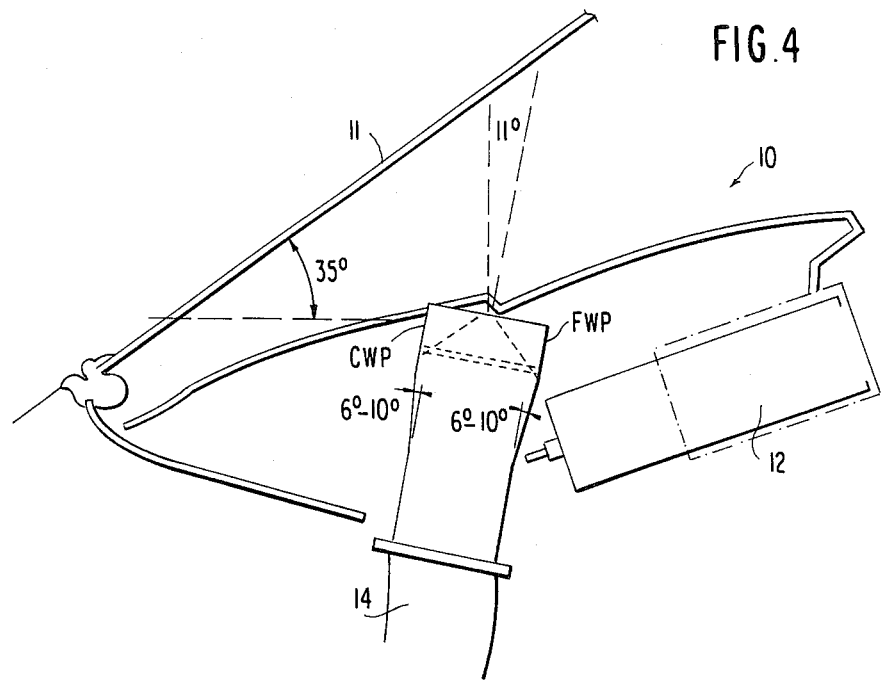
FIG. 4 is a side elevational view of a modification of the invention.

As shown in FIG. 2, the floor and ceiling diverge from between about six degrees to about ten degrees to allow the jet stream to expand thereby avoid creating a back pressure at the control ports CP1 and CP2. This expansion in the outlet is needed for interaction regions which are under about 2.5 W (where W is the width of the power nozzle PN). In FIGS. 1 and 2, the continuous inertance loop CL is shown as a loop which has a pair of control port coupling sections CL-CR and CL-CL and a substantially flat common section CL-C which is of a length and cross-sectional area so as to provide a predetermined oscillatory frequency. The inertance loop CL can have the configuration shown in FIG. 4 which includes a pair of matching sections CLMR and CLML, a pair of uniform cross-section loop sections CLR and CLL which lead to transition sections CLTL and CLTR which connect to a common or cross-over section CL-CO which may pass through the interaction region or, preferrably is simply found on one or the other of floor or ceiling walls FW or CW or both, where the common sections CL-CO is split into two parallel paths.

The relative angular orientation of the fluidic oscillator relative to the windshield for defrost/defog purposes is illustrated in FIG. 5.

FIGS. 6a-6g illustrate the cleaning efficacy of a fluidic oscillator as incorporated in this invention for clearing a windshield of an automotive vehicle. The dotted lines "D-see" indicate the driver's side see area which is the primary area to be initially cleared by the defrost system. Likewise, the "P-see" area is the area on the passenger side of the vehicle which it is desired to be cleared in the initial stages. The lines indicated as D-final and P-final indicate the areas which should be cleared within a predetermined period of time so as to satisfy FMVSS standards. The time of clearing of a Ford Tempo with an outlet according to this invention is illustrated in each of the figures.

It should be noted that in these figures, the area cleared on the driver's side initially is larger and throughout the initial clearing phases is larger than the area on the passenger side. This is due to the desire to have the defroster clear the driver's side at a faster rate than the passenger's side. Accordingly, the sweep angle enhancing vanes 29L and 29R are shifted laterally in outlet opening 21 so that the distance D1 on the passenger side outlet lobe 21R is greater than the distance D2 so that the driver's side lobe 21L receives more of the defrost energy—that is to say, the lobe 21L is larger than the lobe 21R. Moreover, in order to better reach the side windows after clearing of the "see" areas, the necked in portions may be provided with flow distribution enhancers such as a thickening of the panel 25, 26 by addition of an additional thickness of those interior portions of those panels. In effect, the small flows through the leaky splitter are used to enhance the distribution effects of air upon the surfaces to be cleared of frost and fog.

Many modifications may be made without departing from the basic spirit and scope of the present invention, some of which have been suggested hereinabove.

What is claimed is:

1. A fluidic oscillator for issuing a jet, from a source of air under pressure to ambient, said fluidic oscillator including a power nozzle having a predetermined cross-sectional area coupled to a supply of air under pressure, an interaction region receiving a jet of air from said power nozzle, said interaction region being defined by a pair of diverging lateral sidewalls and ceiling and floor walls, leading to an outlet flare, a pair of control ports on opposite sides of said interaction region, a continuous inertance loop interconnecting said control ports and controlling the frequency of oscillation, and leaky splitter means located proximate the center of said outlet flare for modifying the air distribution issuing from said outlet to alternating slugs of air issuing from the lateral ends of said outlet, said leaky splitter including, at least one of said ceiling and floor walls being pinched in proximate the center of said outlet flare.

2. The fluidic oscillator defined in claim 1 wherein said leaky splitter includes a pair of sweep angle enhancing vanes mounted at predetermined angles, respectively, relative to the axial center of said fluidic oscillator.

3. A fluidic oscillator for issuing a jet, from a source of air under pressure to ambient, said fluidic oscillator including a power nozzle having a predetermined cross-sectional area coupled to a supply of air under pressure, an interaction region receiving a jet of air from said power nozzle, said interaction region being defined by a pair of diverging lateral sidewalls and ceiling and floor walls, leading to an outlet flare, a pair of control ports on opposite sides of said interaction region, a continuous inertance loop interconnecting said control ports and controlling the frequency of oscillation, and leaky splitter located proximate the center of said outlet flare for modifying the air distribution issuing from said outlet to alternating slugs of air issuing from the lateral ends of said outlet, said leaky splitter means includes means intruding from each said ceiling and floor walls toward each other and terminating to leave a space for air flow therebetween, thereby lowering the flow impedance thereof.

4. The fluidic oscillator defined in claim 3 wherein said leaky splitter means includes at least one sweep angle enhancing vane mounted at a predetermined angle relative to the axial center of said fluidic oscillator.

5. The fluidic oscillator defined in claim 3 wherein said leaky splitter includes a pair of sweep angle enhancing vanes mounted at a predetermined angle relative to the axial center line of said fluidic oscillator, one of said vanes being closer to said axial center line than the other thereof to modify the distribution of air through said outlet in a predetermined fashion.

6. The fluidic oscillator defined in claim 3 wherein the distance from said power nozzle to said outlet is 2.5 W or less, where W is the width of said power nozzle, and wherein one or more of said floor and ceiling panels is at an angle to a plane containing the axial center line of said fluidic oscillator to permit expansion of the air jet issuing through said power nozzle.

7. The fluidic oscillator defined in claim 6 including flow straightener means between said power nozzle and said source for stabilizing the velocity profile of air issuing through said power nozzle into said interaction region.

8. In an vehicle defrost/defog system having a source of defrost/defog air, the improvement comprising, the fluidic oscillator defined in claim 7 mounted in the instrument/dash panel of said vehicle and oriented to direct alternate slugs of defrost/defog air upon said windshield.

9. In a motor vehicle windshield defrost/defog system having a source of defrost/defog air and a centrally located nozzle for issuing defrost/defog air upon the driver and passenger sides, respectively, of a windshield surface to be cleared, the improvement comprising means for causing said defrost/defog air to issue in two alternating slug flows of substantially the full intensity of said source, first one of said two slug flows upon the driver side for a predetermined period of time and then the other of said two slug flows upon the passenger side for essentially the same predetermined period of time.

* * * * *